United States Patent [19]

Morishita et al.

[11] 4,339,771
[45] Jul. 13, 1982

[54] SOLID-STATE COLOR IMAGING APPARATUS HAVING AN EXCELLENT RESOLUTION

[75] Inventors: Masanobu Morishita; Takanori Tanaka, both of Tokyo, Japan

[73] Assignee: Nippon Electric Co., Ltd., Tokyo, Japan

[21] Appl. No.: 183,394

[22] Filed: Sep. 2, 1980

[30] Foreign Application Priority Data

Aug. 31, 1979 [JP] Japan ............................. 54-111371

[51] Int. Cl.$^3$ .............................................. H04N 9/07
[52] U.S. Cl. ......................................... 358/41; 358/44
[58] Field of Search ....................... 358/41, 43, 44, 47, 358/48, 213

[56] References Cited

U.S. PATENT DOCUMENTS

| | | | |
|---|---|---|---|
| 3,971,065 | 7/1976 | Bayer | 358/41 |
| 4,131,913 | 12/1978 | Yamanaka | 358/44 |
| 4,200,883 | 4/1980 | Yamanaka | 358/44 |
| 4,227,206 | 10/1980 | Nagumo | 358/44 |

*Primary Examiner*—Michael A. Masinick
*Attorney, Agent, or Firm*—Laff, Whitesel, Conte & Saret

[57] ABSTRACT

Picture elements or light-sensitive elements of a solid-state area image sensor have associated color filter elements with three spectral sensitivity characteristics. The human eye requires a first of these colors to have a spectral sensitivity characteristic for producing a high level of visual resolution such as, for example, a green light of a luminance characteristic. The human eye does not require the second and third colors to have such a high resolution of a spectral sensitivity characteristic, such as, for example, a red or blue light, respectively. The green light-sensitive picture elements are arrayed at alternate picture element positions in every horizontal row and at alternate scanning line positions in every vertical column, in order to form a checkerboard pattern. The remaining picture elements are arrayed so that the interspaces between the green light-sensitive picture elements are alternately occupied in the successive scanning lines by the red and blue light sensitive picture elements. Narrow-band signals are provided by the light-sensitive elements for each color and a wide band signal is provided for the color requiring a high resolution. From these various signals, a narrow band signal is synthesized to improve the resolution of the entire picture.

22 Claims, 35 Drawing Figures

FIG.5(b) $G_W$ 
FIG.5(c) $G_N$ 
FIG.5(d) $G_H = G_W - G_N$
FIG.5(e) $0.6 G_N + \alpha G_H$
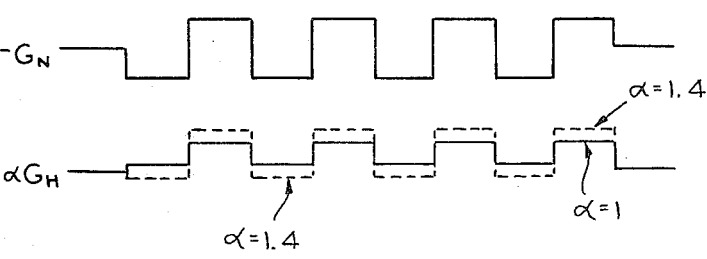

FIG.6(b) $G_W$ 
FIG.6(c) $G_N$ 
FIG.6(d) $G_H = G_W - G_N$
FIG.6(e) $0.6 G_N + \alpha G_H$
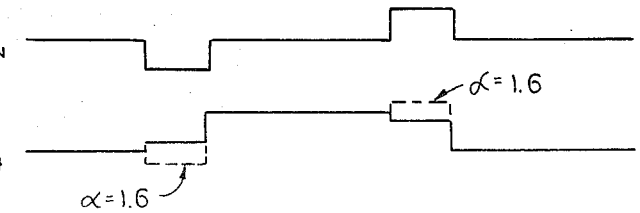

FIG.11(b) $G_W$ 
FIG.11(c) $G_N$ 
FIG.11(d) $G_N'$ 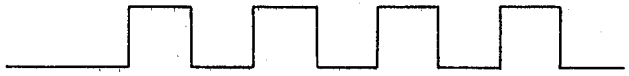
FIG.11(e) $G_H = G_W - G_N'$ 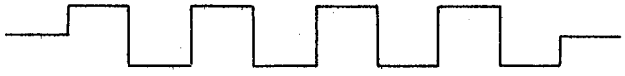
FIG.11(f) $0.6 G_N + \alpha G_H$ 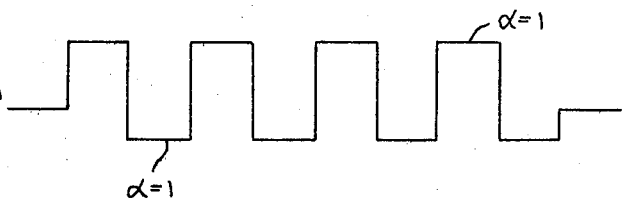

FIG.12(b) $G_W$ 
FIG.12(c) $G_N$ 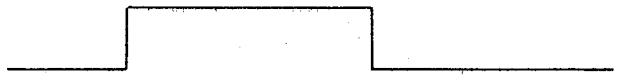
FIG.12(d) $G_N'$ 
FIG.12(e) $G_H = G_W - G_N'$ 
FIG.12(f) $0.6 G_N + \alpha G_H$ 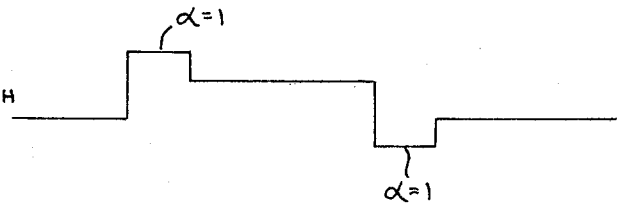

SOLID-STATE COLOR IMAGING APPARATUS HAVING AN EXCELLENT RESOLUTION

The present invention relates to a solid-state color imaging apparatus employing charge transfer devices.

Solid-state color imaging apparatus employing charge transfer devices are classified into those making use of a one area image sensor, those making use of two such area image sensors, and those making use of three such area image sensors. Those using a one area sensor are composed of charge transfer devices in which the respective red, blue, green and luminance signals are derived from the output signal of the area image sensor. In a two area sensor the respective green and luminance signals are derived from one of the area image sensors. In a three area sensor, red, blue and green signals are derived from the respective individual area image sensors and a luminance signal is synthesized from these red, blue and green signals. Among them, the imaging apparatus making use of a one area image sensor is superior in its small size and for the overall apparatus, improved resolution, and low color aberration.

One known example of the solid-state color imaging system, making use of one area image sensor, is constructed in the following manner. That is, a mosaic form of color filter is attached to an area image sensor in which a plurality of light sensitive elements are arrayed in a two-dimensional array. This color filter has a so-called Bayer geometry proposed in U.S. Pat. No. 3,971,065 by B. E. Bayer. The patented device is adapted to apply filter elements for the same color component to two vertically adjacent light sensitive elements in order to improve a resolution of an interlacing scanned television picture. Green filter elements are arrayed alternately in both the horizontal and vertical directions, that is, in a checkerboard pattern. The interspaces between these green filter elements are alternately arrayed with red filter elements or blue filter elements in the vertical directions.

In order to achieve interlace scanning, such an area image sensor is applied directly and via a 1H delay line to a green signal detector circuit, where a wide-band green signal is detected. A narrow-band green signal (i.e. lower frequency components of the wide-band green signal) is obtained by passing the wide-band green signal through a low-pass filter. After the wide-band green signal is passed through a delay line having an appropriate delay time, a difference between the delayed wide-band green signal and the narrow-band green signal is derived to obtain a high frequency green signal which forms a high frequency component of a luminance signal.

In addition, the output signal of the area image sensor is directly applied to a red/blue signal detector circuit to obtain a red or blue signal, and furthermore, the output signal of the 1H delay line is applied to a blue/red signal detector circuit to obtain a blue or red signal. Since a red signal and a blue signal appear alternately for the successive horizontal scanning lines, at the outputs of these red/blue signal detector circuit and blue/red signal detector circuit, these output signals are converted into a consecutive red signal and a consecutive blue signal. The consecutive red and blue signals are respectively passed through low-pass filters to apply them to a color encoder. In the color encoder, a composite color signal is synthesized from the high frequency green signal, narrow-band green signal, red signal and blue signal.

In the above-mentioned solid-state color imaging system, the green signal is obtained by combining output signals derived from the light sensitive elements on two vertically adjacent scanning lines. The visual sensitivity of the human eye for the green light is high as will be seen from the fact that the green signal can be used as a luminance signal. Therefore, the above-described known system has a disadvantage because a resolution in the vertical direction is still low.

It is a major object of the present invention to provide a solid-state color imaging apparatus making use of one area image sensor, which can reproduce an image having a high resolution and being free from color aberration.

According to the present invention, the respective picture elements or light sensitive elements of a solid-state area image sensor are associated with color filter elements which have three spectral sensitively characteristics, in such a relationship that each filter element has one of the three spectral sensitivity charcteristics. A first one of the three spectral sensitivity characteristics is a spectral sensitivity characteristic which is required to have a visually high resolution such as, for example, a sensitivity characteristic response to the green light or light having a luminance characteristic. The second and third spectral sensitivity characteristics are those which are not required to have a visually high resolution such as, for example, sensisitivity characteristics responsive to the red light and the blue light, respectively.

In the following description for the purpose of simplicity a, description will be made in reference to these respective picture elements or light sensitive elements as green light sensitive picture elements, red light sensitive picture elements and blue light sensitive picture elements, respectively. Of course, the spectral sensitivity characteristics should not be limited to the above-mentioned example. It will be easily understood that the same effects can be achieved even when the first spectral sensitivity characteristic is flat in the visible light region. That is, a first sensitivity characteristic may be responsive to the white light and the second and third spectral sensitivity characteristics may be responsive to the yellow light and the cyan color light, respectively.

With regard to the mode of arraying the respective picture elements, the green light sensitive picture elements are arrayed at alternate picture element positions in every horizontal row and at alternate scanning line positions in every vertical column, that is, in a checkerboard pattern. The remaining picture elements are arrayed in such manner that the interspaces between the green light sensitive picture elements are occupied by the red light sensitive picture elements and the blue light sensitive picture elements, alternately in the successive scanning lines.

A narrow-band green signal is derived from a first detector circuit for detecting a signal corresponding to the green light sensitive picture elements from the output signal of the solid-state imaging device. In addition, a narrow-band red signal and a narrow-band blue signal, which are not intermittent, are derived by alternately changing in the successive periods of 1 H, between the output signals of two detector circuits. One of the two detector circuits is a second detector circuit for detecting a signal corresponding to the picture elements responsive to a colored light other than the green light from the output signal of the solid-state area image sensor. The detected signal includes a red signal and a blue signal changing alternately in the successive periods of 1H. The other detector circuit is a third detector circuit for detecting a signal corresponding to the picture elements responsive to a colored light other than the green light from the signal produced by delaying the output signal of the solid-state area image sensor by 1 H. The signal detected by the third detector circuit includes a blue signal and a red signal changing alternately in the successive periods of 1 H. Furthermore, a wide-band green signal is separated from a signal corresponding to the green light sensitive picture elements alternately by a 1 H delay means and a fourth detector circuit, and produced by mixing the output signal of the solid-state area image sensor and the signal produced by delaying the output signal by 1 H at the successive picture element positions.

A signal produced by subtracting the narrow-band green signal from this wide-band green signal, is used as a high frequency component of a luminance signal. This high frequency component is mixed, in a color encoder, with the low frequency component of the luminance signal, which is synthesized from the three narrow-band primary color signals, and thereby a wide-band luminance signal is synthesized. Upon synthesizing the wide-band luminance signal, it is preferable to select the level of the high frequency component of the luminance signal to level which is higher than the level of the low frequency component thereof.

Owing to the above-described construction, with regard to a resoltuion in the horizontal direction, the number of the green light sensitive picture elements scanned in each horizontal scanning period is virtually increased up to the number of picture elements in one horizontal row of the solid-state imaging device. This increase results from making by making use of the 1 H delayed signal. With regard to a resolution in the vertical direction, theoretically the upper limit resolution can be enhanced up to the number of scanning lines because the 1 H delayed signal is not used for producing the narrow-band green signal. Whereas, with regard to the red signal and the blue signal, the 1 H delayed signal and the undelayed signal are alternately switched in the successive horizontal scanning periods to produce consecutive signals. Therefore, the red signal and the blue signal have a color aberration in the vertical direction with respect to the green signal. However, since neither the red image nor the blue image is required to have a high resolution, this color aberration is of no consequence, in view of the visual sensitivity of the human eye.

According to the present invention, a picture image having a high resolution can be obtained as described above. Moreover there is an advantage if the leve of the high frequency component of the luminance signal is higher than the level of the low frequency component thereof. A contour signal which performs a second order differential calculus can be added to the picture signal with respect to the horizontal direction. At the same time, a contour signal with respect to the vertical direction can be also added to the picture signal.

The above-mentioned and other objects, features and advantages of the present invention will become more apparent from the following detailed description of embodiments taken in conjunction with the accompanying drawings, wherein.

Figure 3B:
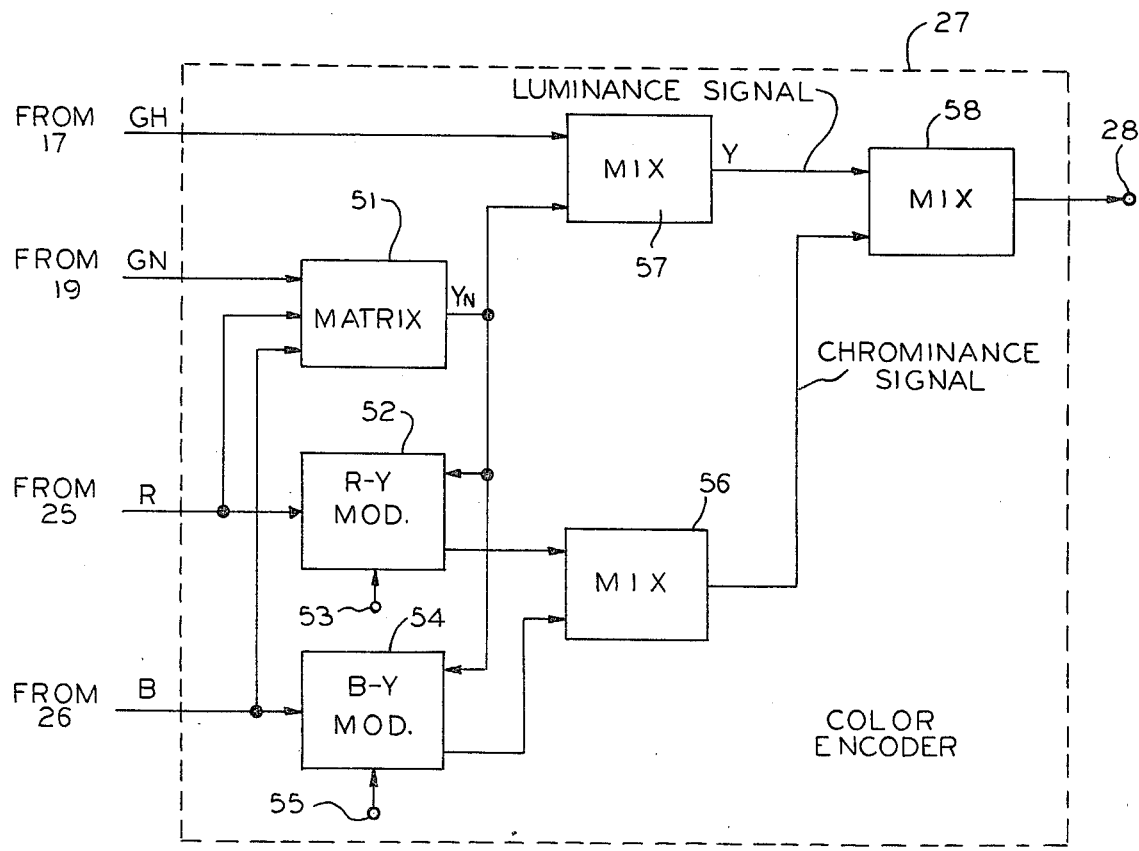
Figure 3A:
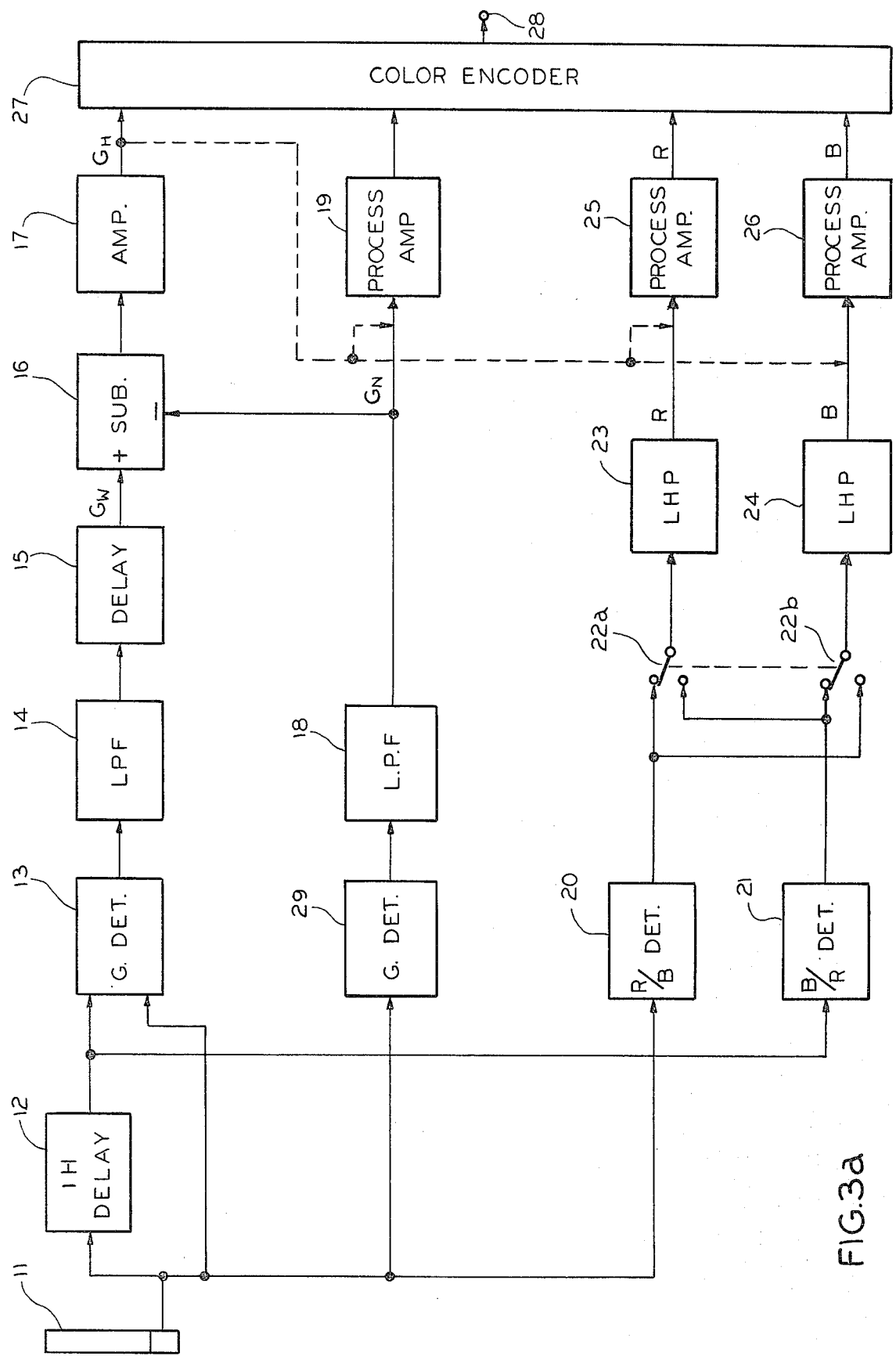
Figure 4A:
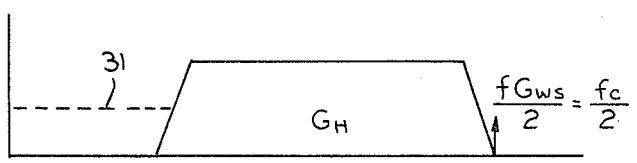
Figure 4B:
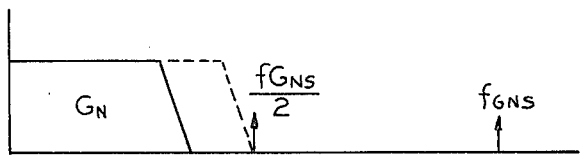
Figure 4C:
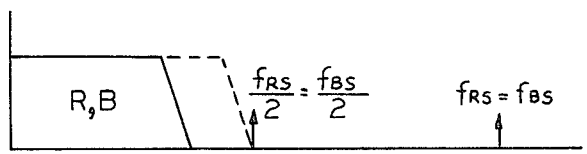
Figure 7:
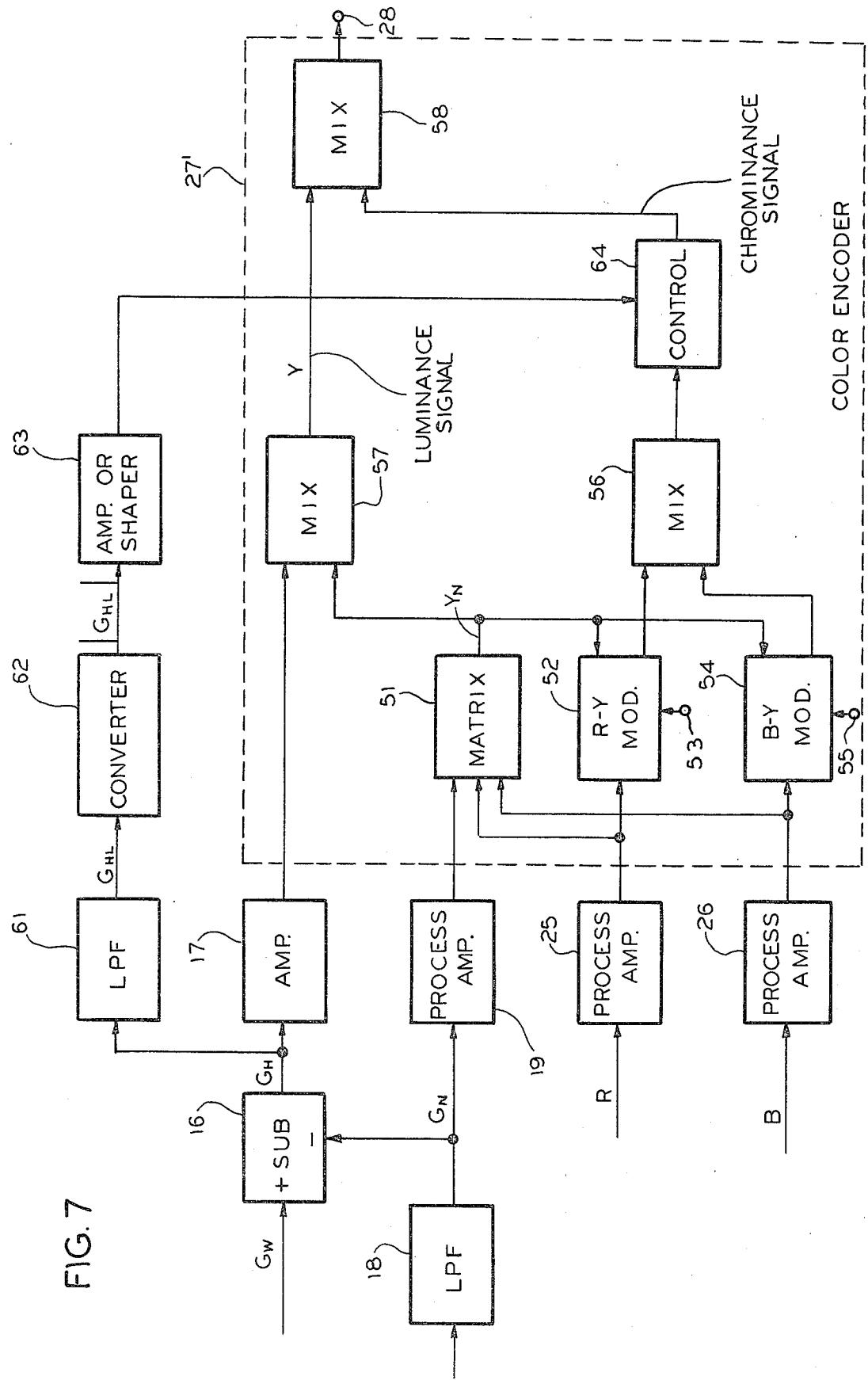
Figure 8:
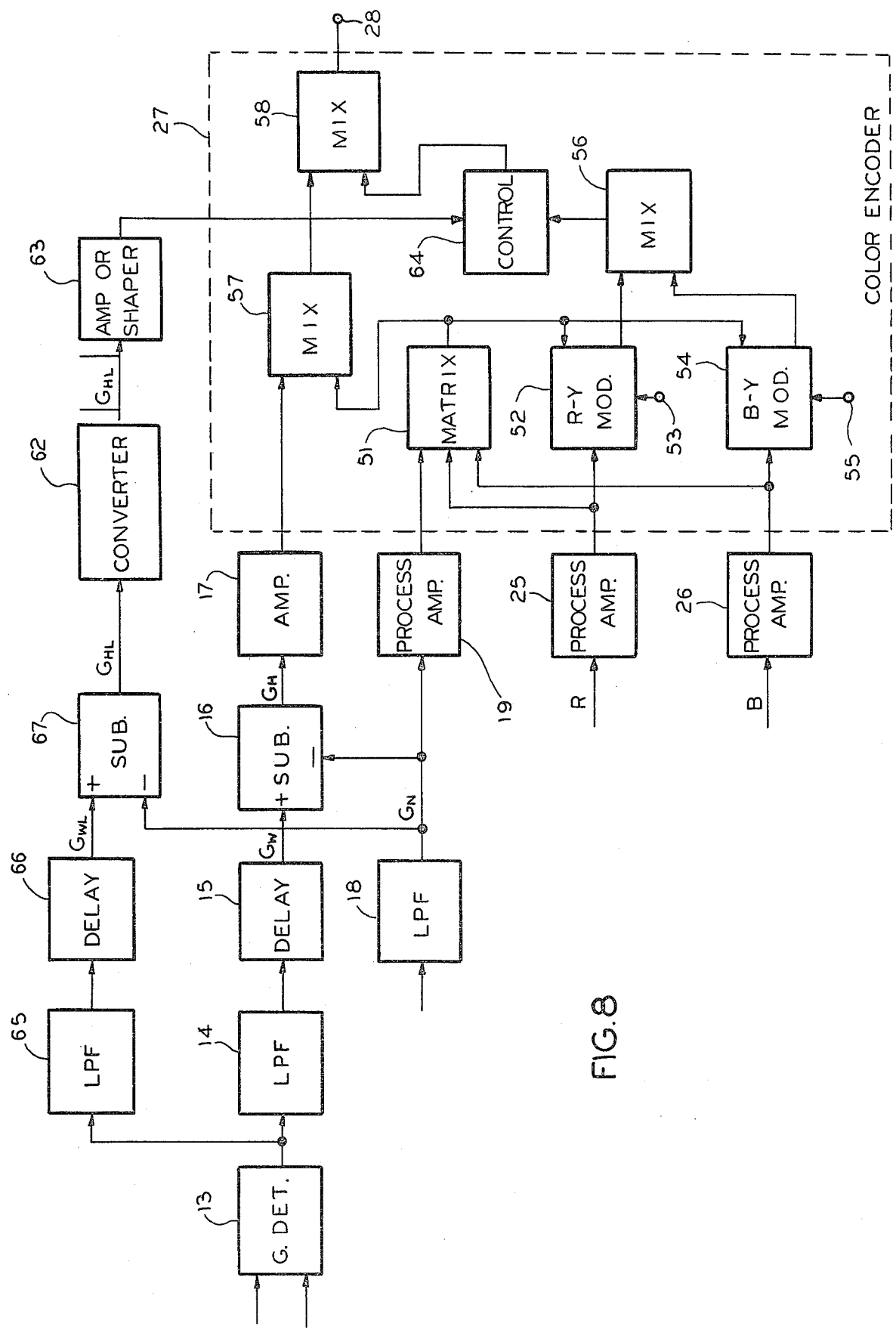
Figure 9:
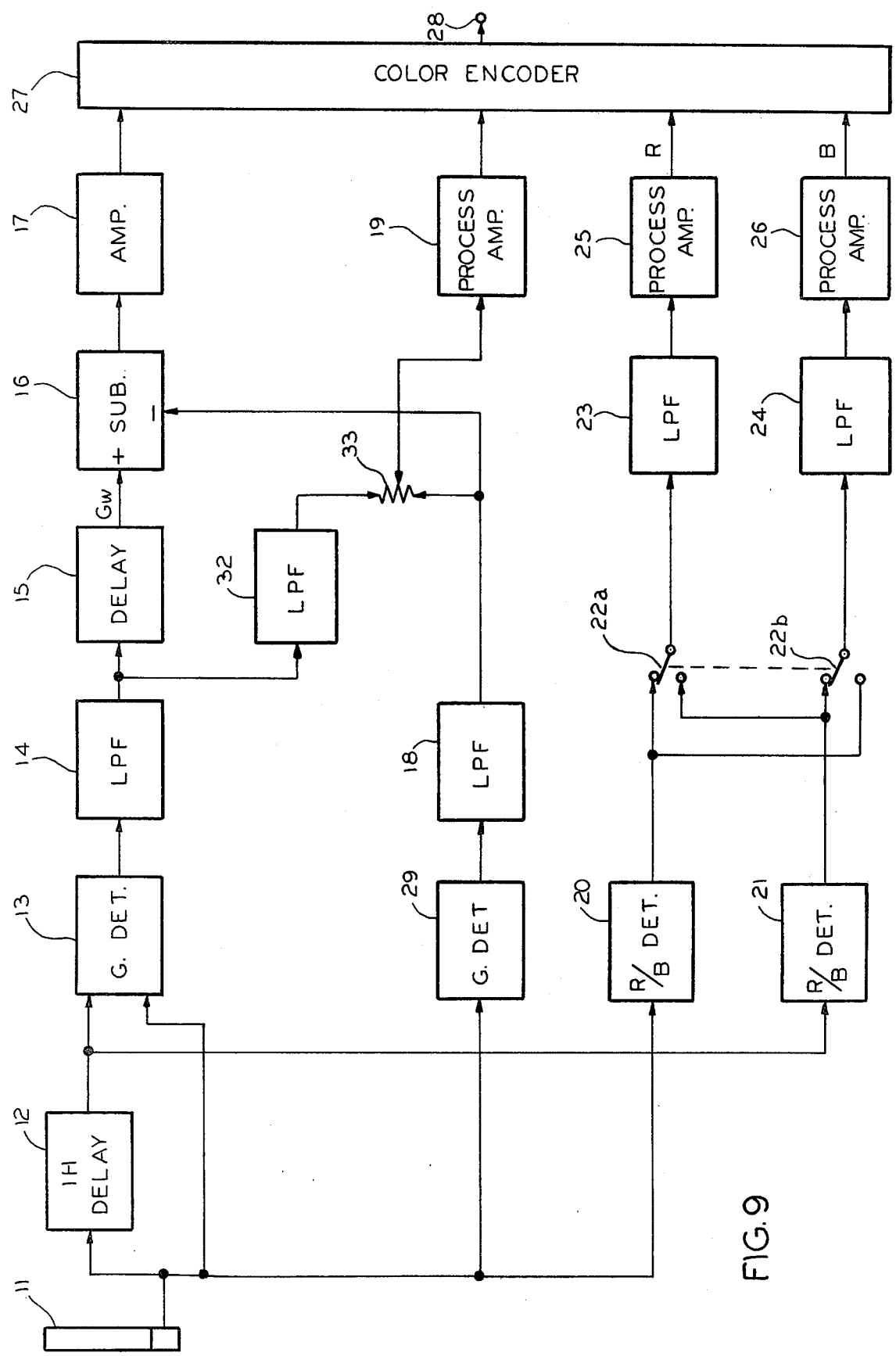
Figure 10:
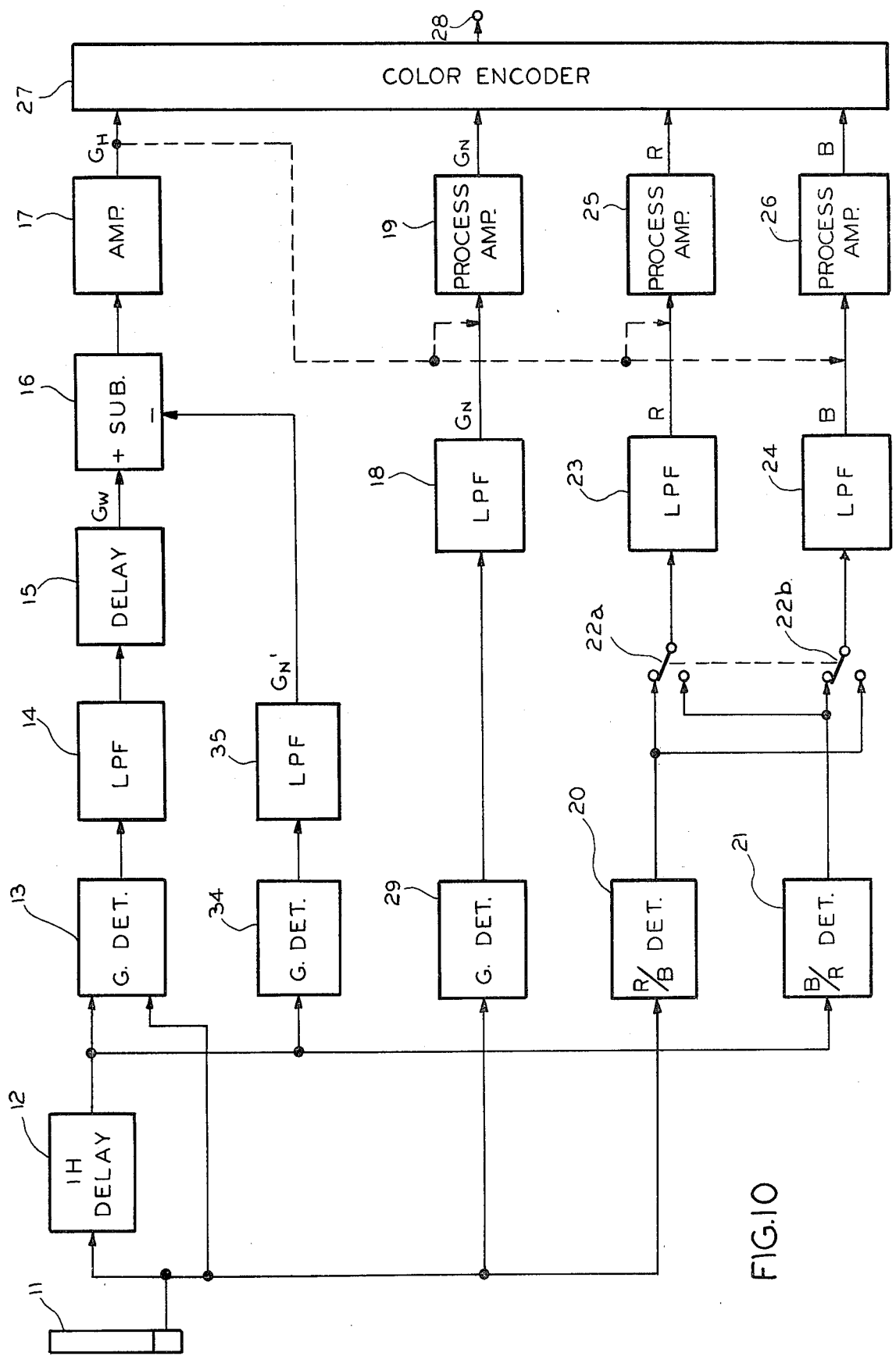
Figure 11A:
Figure 12A:
Figure 13:
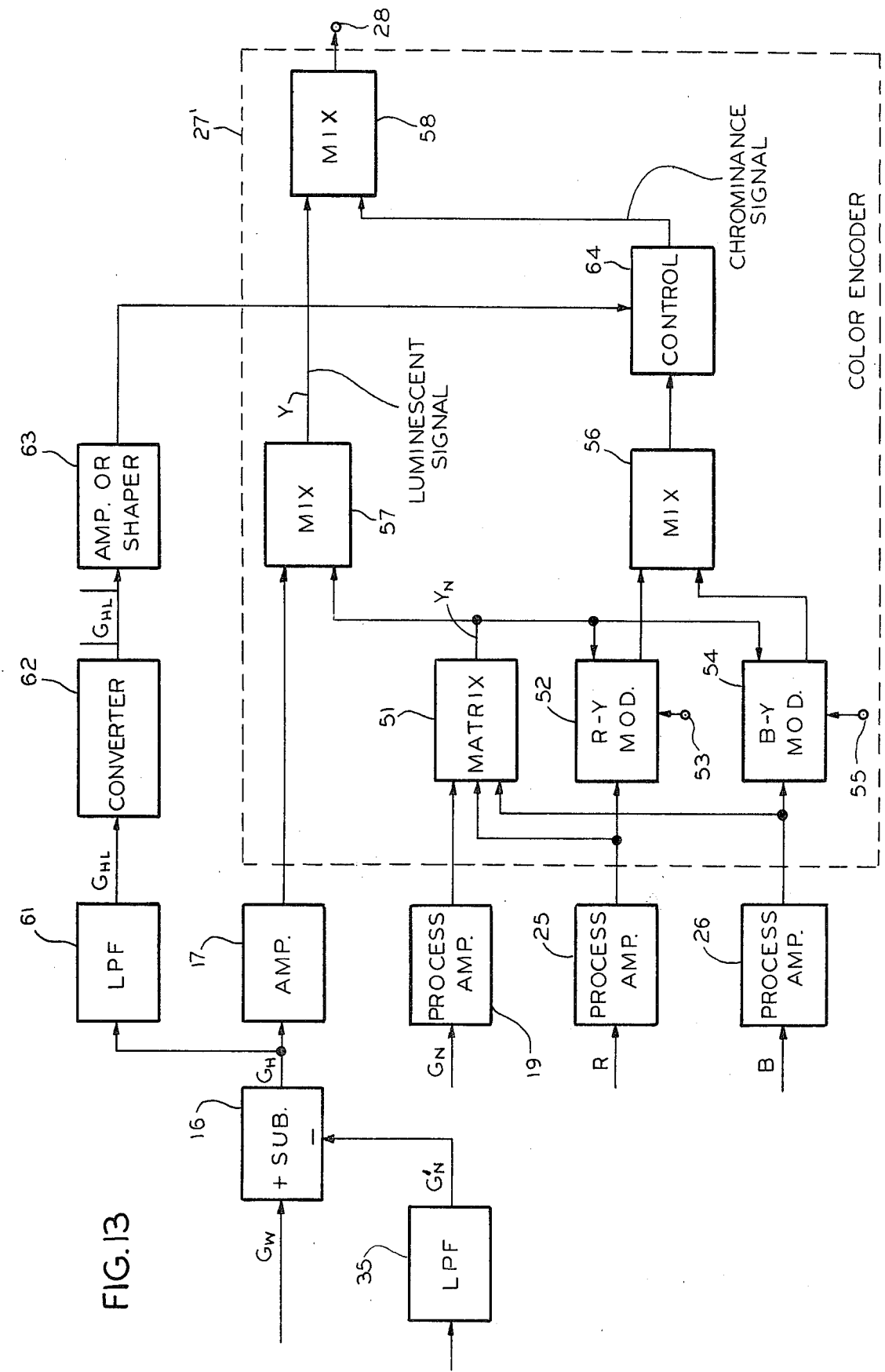
Figure 14:
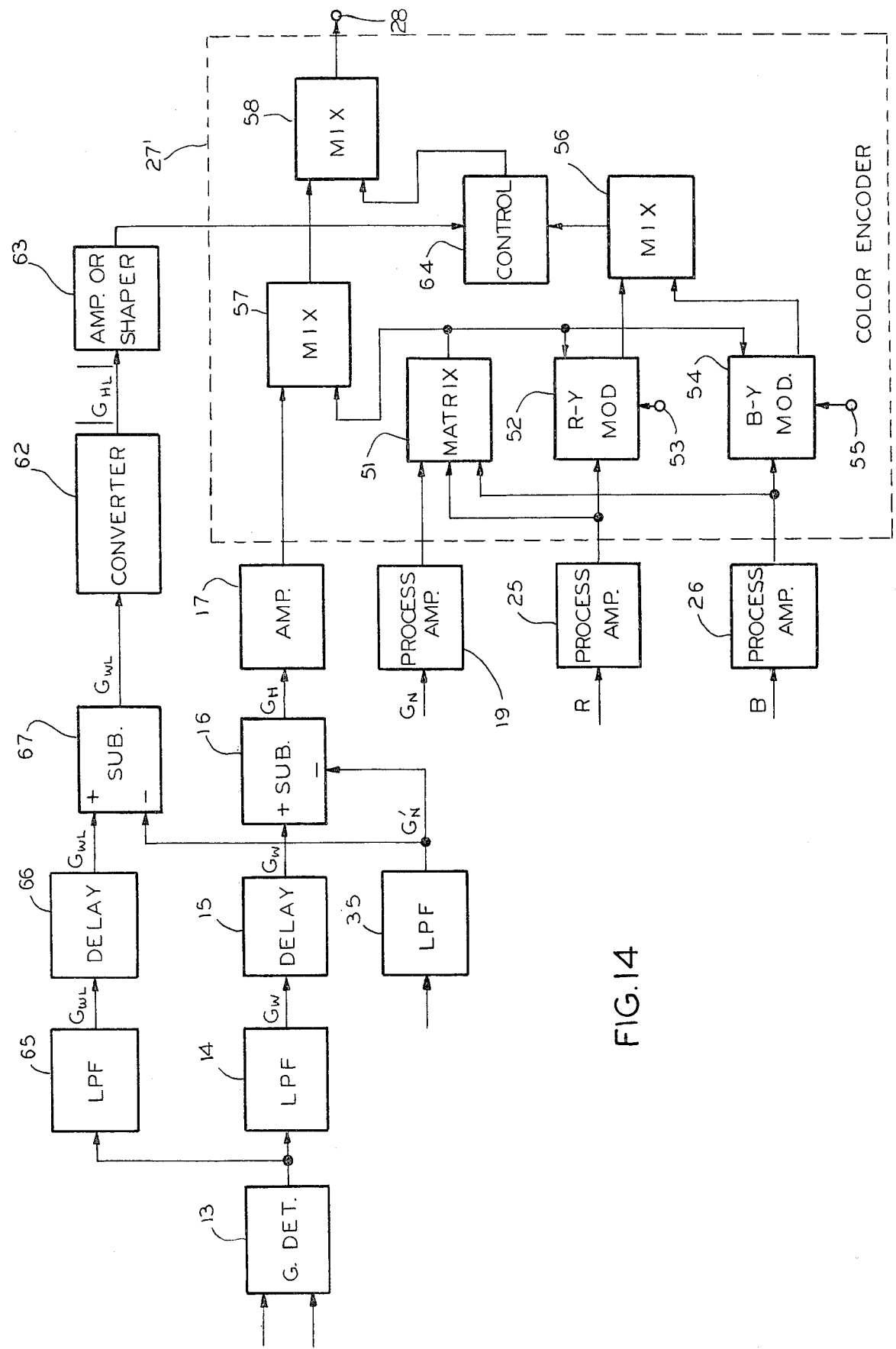

FIGS. 3(a) and 3(b) are block diagrams showing a first embodiment of the present invention;

FIGS. 4(a) 4(b) and 4(c) are diagrams to be used for explaining the frequency bands of the respective signals in the first embodiment of the present invention;

FIGS. 5(a) through 5(e) are waveform diagrams showing various signal waveforms produced for a given black-and-white picture pattern having black-white changes in only the vertical direction, as imaged by the first embodiment of the present invention;

FIGS. 6(a) through 6(e) are waveform diagrams showing various signal waveforms produced for another given black-and-white picture pattern having black-white changes in only the vertical direction as imaged by the first embodiment of the present invention;

FIG. 7 is a block diagram showing one modification of a color encoder and its peripheral circuit in the first embodiment of the present invention;

FIG. 8 is a block diagram showing another modification of the color encoder and its peripheral circuit in the first embodiment of the present invention;

FIG. 9 is a block diagram showing a second embodiment of the present invention;

FIG. 10 is a block diagram showing a third embodiment of the present invention;

FIGS. 11(a) through 11(f) are waveform diagrams showing various signal waveforms produced for a given black-and-white picture pattern having black-white changes in only the vertical direction as imaged by the third embodiment of the present invention;

FIGS. 12(a) through 12(f) are waveform diagrams showing various signal waveforms produced for another given black-and-white picture pattern having black-white changes in only the vertical direction as imaged by the third embodiment of the present invention;

FIG. 13 is a block diagram showing one example of a color encoder and its peripheral circuit in the third embodiment of the present invention; and FIG. 14 is a block diagram showing another example of the color encoder and its peripheral circuit in the third embodiment of the present invention.

Figure 1:
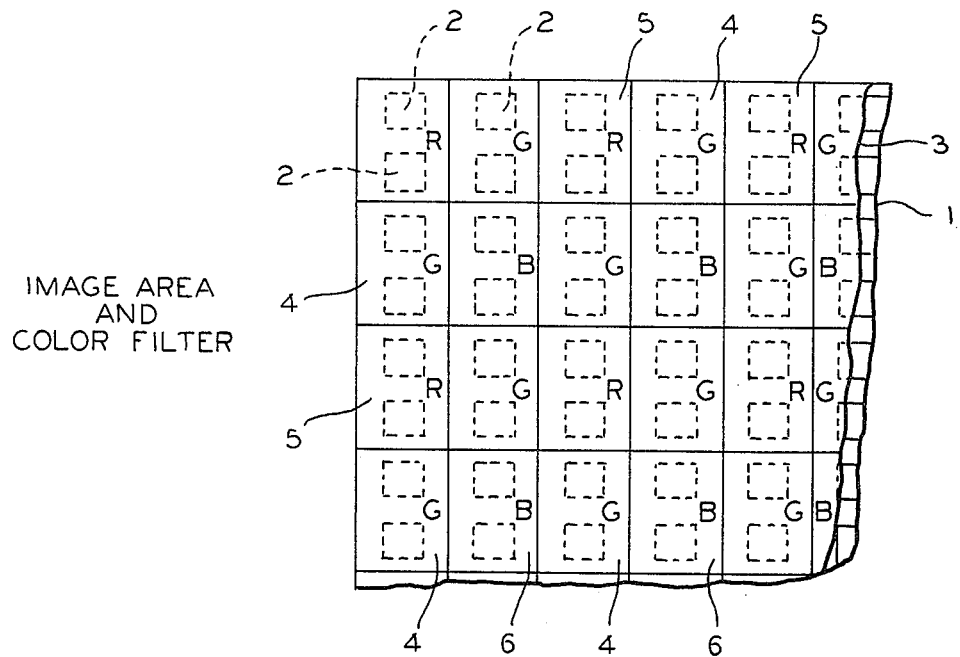
FIG. 1 is a partial plan view showing the relationship between an area image sensor and a color filter.

Referring now to FIG. 1, a solid-state area image sensor and a mosaic form of color filter are partly illustrated, as combined in an aligned condition. The respective filter elements forming the color filter are arrayed in such manner that each filter element may cover one light sensitive element 2 in one horizontal row and two light sensitive elements 2 in one vertical column. Such an array is employed because the standard television system has the interlace scanning. Hence, it is necessary to read out alternate picture elements in every vertical column in the scanning of one field.

In this figure, reference numeral 1 designates a solid-state area image sensor, numeral 2 designates light sensitive elements, numeral 3 designates a mosaic form of filter, numeral 4 designates green light permeable filter elements, numeral 5 designates red light permeable filter elements and numeral 6 designates blue light permeable filter elements. Two vertically adjacent light sensitive elements 2 are paired for each filter block. The green light permeable filter elements 4 are disposed on the alternate pairs of light sensitive elements in the horizontal direction as well as in the vertical direction. The red light permeable filter elements 5 and the blue light permeable filter elements 6 are disposed on the pairs of light sensitive elements 2 located between the green light permeable filter elements 4. The red light permeable filter elements 5 and the blue light permeable filter elements 6, respectively, are arrayed on the alternate horizontal rows of the light sensitive element pairs.

Figure 2:
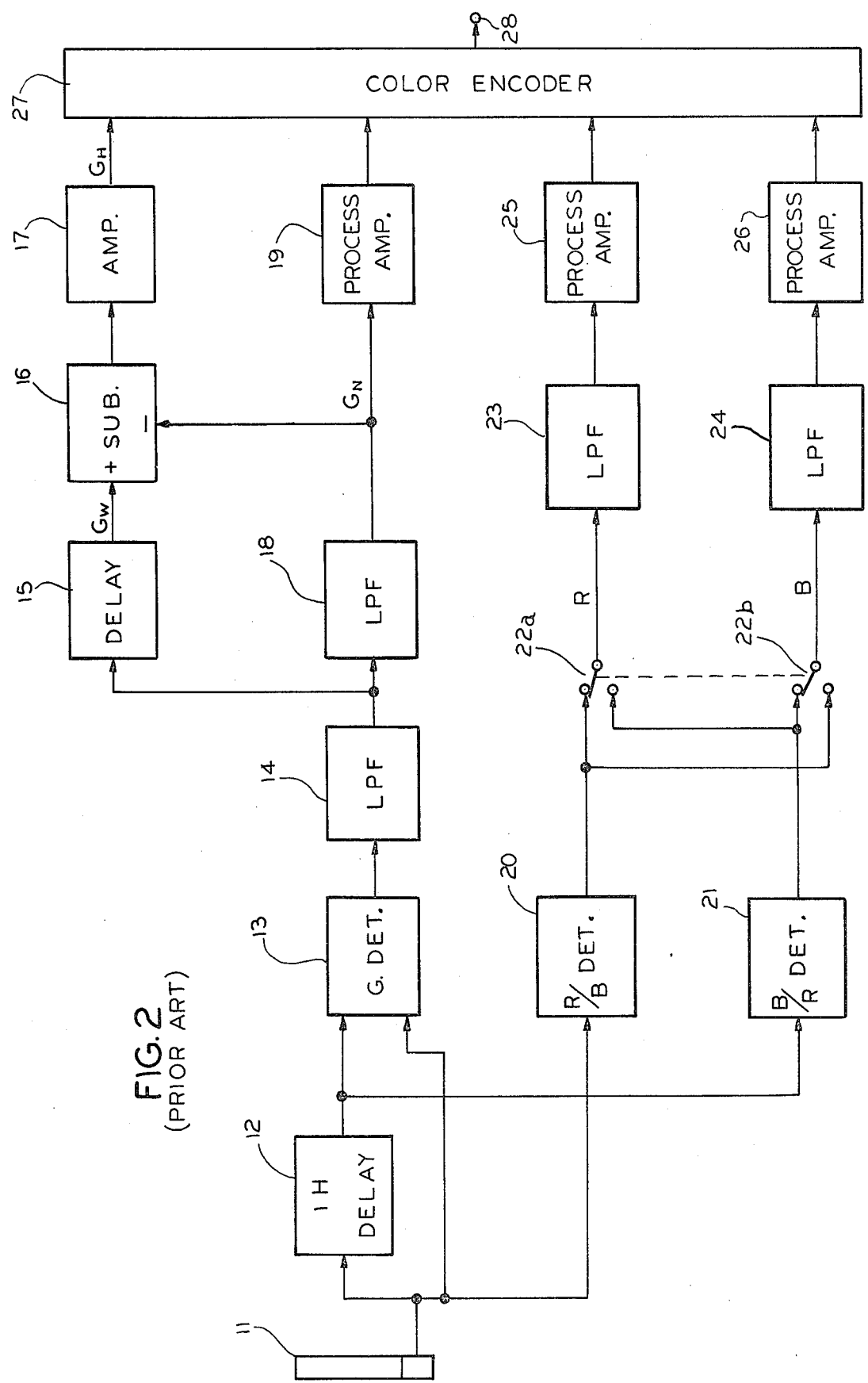
FIG. 2 is a block diagram showing a solid-state color imaging apparatus in the prior art.

FIG. 2 shows a block diagram of a solid-state color imaging apparatus in the prior art. Three primary color signals are separated from an output signal of a solid-state area image sensor 11 having the filter element array as shown in FIG. 1. A composite color television signal is synthesized from these three primary color signals.

In FIG. 2, an output signal of a solid-state area image sensor 11 associated with the color filter illustrated in FIG. 1 is fed to 1 H (one horizontal scanning period) delay line 12. In a green signal detector circuit 13, a wide-band green signal is produced from the output of the 1 H delay line 12 and the output of the solid-state area image sensor 11. Then, the wide-band green signal is converted into a continuous video signal on passage through a low-pass filter 14 having a cut-off frequency equal to the Nyquist frequency.

On the other hand, the output signal of the solid-state area image sensor 11 is also applied to a detector circuit 20 for detecting a signal other than the green signal (i.e. a red signal or a blue signal). At the same time, the output signal of the 1 H delay line 12 is applied to another detector circuit 21 for detecting a signal other than the green signal (i.e. a blue signal or a red signal). As will be readily seen from the array of filter elements shown in FIG. 1, if one of the output signals of the detector circuits 20 and 21 is a red signal, then the other output signal is a blue signal, and vice versa. Accordingly, by alternately switching these output signals in the successive horizontal scanning periods, by switches 22a and 22b, the output signal of the switch 22a is always a red signal, while the output signal of the switch 22b is always a blue signal.

These red and blue signals are respectively passed through low-pass filters 23 and 24. Then, they are fed to a color encoder 27 via process amplifiers 25 and 26, respectively, which include a gamma correction circuit, a white clipping circuit, a black clipping circuit, etc. On the other hand, the output of the previously described low-pass filter 14 is fed to a delay line 15 and a low-pass filter 18.

The low-pass filter 18 has the same characteristics as the low-pass filters 23 and 24. The delay line 15 has a delay time equal to that of a low-pass filter 18, so that subtracting processing can be done in a coincident phase in a subtractor 16. A narrow-band green signal, at the output of the low-pass filter 18, is fed to the color encoder 27 via a process amplifier 19. The output signal of the subtractor 16 is amplified in an amplifier 17, to an appropriate level, as a high frequency green signal and then fed to the color encoder 27. From the narrow-band red, green and blue signals fed to the color encoder 27 are synthesized a narrow-band luminance signal and two kinds of color difference signals. The high frequency green signal is used as a high frequency luminance signal. From these signals, a wide-band composite color television signal can be synthesized in the color encoder 27, and fed from an output terminal 28.

In the prior art apparatus shown in FIG. 2, the green signal is a signal formed from a 1 H delayed output signal of the solid state image sensor 11 and an undelayed output signal of the same signal. That is, the signal is formed from the output signals of two different light sensitive elements 2 which are deviated in the vertical direction. Whereas, the red signal and the blue signal, respectively, involve an identical signal in two successive horizontal scanning periods because they are alternately output from different detector circuits 20 and 21, in the successive horizontal scanning periods. Consequently, the resolution in the vertical direction is less than one-half of the number of effective scanning lines which gives the highest attainable resolution.

Now, a first embodiment of the present invention will be described with reference to FIGS. 3(a) and 3(b). Here, it is to be noted that component circuits which are designated by the same reference numerals as those used in FIG. 2 are circuits having functions which are identical to the functions of the component circuits shown in FIG. 2.

An output signal derived from an area image sensor 11 associated with a filter as shown in FIG. 1, is an input applied to a first green signal detector circuit 13, a second green signal detector circuit 29 and a red/blue signal detector circuit 20. On the other hand, the output signal of the area image sensor 11 is further input, via a 1 H (one horizontal scanning period) delay line 12, to the first green signal detector circuit 13 and a blue/red signal detector circuit 21.

In the first green signal detector circuit 13, the output signal of the area image sensor 11 is received through the 1 H delay line 12. The same output signal is fed directly to circuit 13. The two output signals are alternately switched in the successive picture element periods for the successive picture elements arrayed in every horizontal scanning line, to derive a consecutive green signal. In the second green signal detector circuit 29, an output signal is derived from the light sensitive elements 2 associated with the green filter elements 4. In the red/blue signal detector circuit 20 and in the blue/red signal detector circuit 21, respectively, an output signal is derived from the light sensitive elements 2 arrayed in the interspaces between the green filter elements 4, as aligned with red or blue filter elements 5 or 6.

From the output signal of the first green signal detector circuit 13 is formed a wide-band green signal $G_W$, via a low-pass filter 14 and a delay circuit 15. From the output signal of the second green signal detector circuit 29 is formed a narrow-band green signal $G_N$ (this corresponds to a lower frequency part of the wide-band green signal $G_W$), via a low-pass filter 18. The wide-band green signal $G_W$ and the narrow-band green signal $G_N$ are matched in phase by the delay circuit 15. A difference between these signals $G_W$ and $G_N$ is produced in a subtractor 16. A high frequency green signal $G_H$ is formed by amplifying the difference, to an appropriate level, in an amplifier 17. This high frequency green signal $G_H$ is input to a color encoder 27. The narrow-band green signal $G_N$ is subjected to gamma correction, white clipping, black clipping, etc. in a process amplifier 19, and then it is input to the color encoder 27.

The red/blue signal detector circuit 20 alternately outputs a red signal, and a blue signal in the successive horizontal scanning periods. The blue/red signal detector circuit 21 alternately outputs a blue signal and a red signal in the successive horizontal scanning periods. These output signals are alternately switched by switches 22a and 22b in the successive horizontal scanning periods to form consecutive signals consisting of a series of the same color component signals. These consecutive signals are respectively passed through low-pass filters 23 and 24 to produce a red signal R and a blue signal B. These red signals R and blue signals B are subjected to gamma correction, white clipping, black clipping, etc. in process amplifiers 25 and 26, respectively, and thereafter they are input to the color encoder 27.

Within the color encoder 27, as shown in FIG. 3(b), a narrow-band luminance signal $Y_N$ is synthesized by a matrix circuit 51 from the narrow-band green signal $G_N$, red signal R and blue signal B derived from the process amplifiers 19, 25 and 26 (FIG. 3a), respectively. This narrow-band luminance signal $Y_N$ and the high frequency green signal $G_H$ fed from the amplifier 17 are mixed in a mixer 57 (FIG. 3b) to synthesize a wide-band luminance signal Y. The red signal R is applied to an R-Y modulator 52 together with the narrow-band luminance signal $Y_N$. A sub-carrier signal applied through a terminal 53 is modulated by the red color difference signal R-$Y_N$. The blue signal B is applied to a B-Y modulator 54 together with the narrow-band luminance signal $Y_N$. A sub-carrier signal applied through a terminal 55 is modulated by the blue color difference signal B-$Y_N$. The output signals of the R-Y modulator 52 and the B-Y modulator 53 are mixed by a mixer 56 to form a chrominance signal. Thereafter, the chrominance signal is mixed with the wide-band luminance signal Y by a mixer 58 to derive a composite color television signal at an output terminal 28.

In other words, in the solid-state color imaging apparatus according to the present invention shown in FIGS. 3(a) and 3(b), the wide-band green signal $G_W$ and the narrow-band red signal R and narrow-band blue signal B are exactly identical to those in the prior art apparatus shown in FIG. 2. The only difference is in the step of synthesizing the narrow-band green signal $G_N$.

According to the apparatus shown in FIGS. 3(a) and 3(b), the narrow-band green signal at one horizontal scanning period is obtained by the green signal detector circuit 29 and the low-pass filter 18 (FIG. 3a). The green signal detector circuit 29 detects only the output signals of green picture elements in the corresponding horizontal row of the area image sensor 11. The output signals are passed through the low-pass filter 18 to obtain a narrow-band component. Accordingly, the narrow-band green signal on every horizontal scanning line is independent of that on the adjacent horizontal scanning line. Hence, a resolution in the vertical direction is enhanced to be equal to the number of horizontal scanning lines which is the theoretically attainable highest value. With regard to the red signal and the blue signal, this apparatus also produces an identical signal which in each of two successive horizontal scanning periods as done the prior art system in FIG. 2. However, since the visual sensitivity of the human eye is low for the red light and blue light, the resolution would not be degraded in this connection.

As described above, in the system illustrated in FIG. 3, the resolution in the vertical direction of the green signal is determined predominantly by the narrow-band green signal. Therefore, theoretically, the resolution can be increased up to the number of the scanning lines.

FIG. 4, shows the frequency bands of the signals in the respective signal routes in the color imaging system illustrated in FIG. 3, FIG. 4(b) shows the frequency band of the narrow-band green signal $G_N$, and FIG. 4(c) shows the frequency bands of the narrow-band red signal R and the narrow band blue signal B. FIG. 4(a) shows the frequency band of the high frequency green signal $G_H$ which is obtained by subtracting the narrow-band green signal $G_N$ from the wide-band green signal $G_W$.

In this FIG. 4, a frequency component represented by a dash line 31 is the frequency component appearing in the following case. That is, when correlation is calculated between two adjacent scanning lines, if boundaries between two regions having different luminances are parallel to the horizontal direction, the correlation is not present. Accordingly, when converted into its wide-band signal, the signal on the scanning line next to this boundary becomes a signal having a frequency equal to one-half of the horizontal clock frequency of the area image sensor 11, that is, the Nyquist frequency. Due to the low-pass filter 14 (FIG. 3a), the signal is converted into a D.C. signal having a level equal to $\frac{1}{2}$ of the standard level. Therefore, this signal component is represented by the dash line 31 in FIG. 4(a). This component represented by the dash line 31 can be said to be a component appearing in the case where change of luminance arises between adjacent scanning lines.

In FIG. 4, symbol fc represents a clock frequency, symbol $f_{GWS}$ represents a sampling frequency for the wide-band green signal, symbol $f_{GNS}$ represents a sampling frequency for the narrow-band green signal, symbol $f_{RS}$ represents a sampling frequency for the red signal, and symbol $f_{BS}$ represents a sampling frequency for the blue signal.

It is to be noted that the same effects and advantages can be obtained even if the system shown in FIG. 3 is modified in such manner that the switching circuits 22a and 22b in FIG. 3(a) are placed in front of the detector circuits 20 and 21, respectively. Such a relocation would switch the output signal of the solid-state area image sensor 11 and the output signal of the 1H delay line 12 alternately in the successive horizontal scanning periods. Thereafter, the switched signals are fed to detector circuits 20, 21 for detecting a red signal and a blue signal.

FIG. 5 shows waveforms of various signals $G_W$, $G_N$, $G_H$ and the like in the imaging apparatus shown in FIG. 3 in the case of a black-and-white image pattern. In the same field, the white and black appear alternately on the successive scanning lines.

In the following description with reference to FIG. 5, an explanation will be made with respect to the green signal only. FIG. 5(a) represents a black-and-white pattern of a subject to be imaged. In this figure the change of the luminance along the vertical direction of the picture is represented along the horizontal direction. Next, consideration is given to the case where the high level portion and the low level portion in the black-and-white pattern shown in FIG. 5(a) respectively correspond to individual scanning lines in the same field.

FIG. 5(b) illustrates a signal level of the wide-band green signal. Since the signal on two adjacent scanning lines is at the white level on one scanning line and at the black level on the other scanning line, the signal has a frequency equal to $\frac{1}{2}$ of the clock frequency, that is, the Nyquist frequency. The signal is converted into a D.C. signal by the low-pass filter 14 (FIG. 3a), so that the level of the D.C. signal is equal to $\frac{1}{2}$ of the white level. This can be illustrated as shown in FIG. 5(b). Hence the image becomes a uniform intermediate level picture expanded downwardly by one scanning line width from the actual pattern shown in FIG. 5(b).

Figure 5A:

The waveform shown in FIG. 5(c) represents the narrow-band green signal obtained by directly sampling the output signal of the area image sensor 11. It is a signal represented by the same waveform as the black-and-white pattern shown in FIG. 5(a). In this case, the signal passed through the subtractor 16 (FIG. 3a) for the purpose of synthesizing a high frequency green signal, takes the waveform shown in FIG. 5(d). When a wide-band luminance signal is synthesized from this $G_H$ signal in the color encoder 27, considering only the green signals, the level of the luminance signal is equal to $0.6G_N + \alpha G_H$, where $\alpha$ is a coefficient for aperture correction and is generally larger than 1. The waveform in the case of $\alpha = 1.4$ is shown by a dash line in FIG. 5(e). A solid line in FIG. 5(e) represents the waveform in the case of $\alpha = 1.0$. As will be seen from FIG. 5, with regard to the luminance signal, a picture is displaced downwardly by one scanning line width with respect to the true pattern.

FIG. 6 is a diagram used for explaining how the luminance signal is produced at the output of the imaging system according to the present invention, for a white pattern having a width corresponding to the width of four scanning lines in the same field. FIG. 6 will be explained by paying attention to only the green signal, which is similar to the explanation of FIG. 5.

Figure 6A:

FIG. 6(a) represents a black-and-white pattern of a subject to be imaged. In this figure, the level change along the vertical direction is represented along the horizontal direction. FIG. 6(b) represents the signal level of the wide-band green signal $G_W$. More particularly, at the vertical position where the signals on the adjacent two scanning lines are at the white level and at the black level, respectively, it becomes a signal having a frequency equal to ½ of the clock frequency (Nyquist frequency). It is converted by the low-pass filter 14 (FIG. 3a) into a D.C. signal which has a level equal to ½ of the white level. Thus, FIG. 6(b) represents the conversion of the signal of the scanning line next to the black-and-white boundary (as viewed along the vertical direction) into an intermediate level between the white level and the black level.

The signal shown in FIG. 6(c) is a narrow-band green signal $G_N$ obtained by directly sampling the output signal of the area image sensor 11. It has a waveform identical to the black-and-white pattern shown in FIG. 6(a). In this case, the signal passed through the subtraction circuit 16 for synthesizing a high frequency green signal.

When a wide-band luminance signal is synthesized from this signal in the color encoder 27, considering only the green signals, the level of the luminance signal is equal to $0.6 G_N + \alpha G_H$, where $\alpha$ is a coefficient for aperture correction and is generally larger than 1. The waveform in the case of $\alpha = 1.6$ is shown by a dash line in FIG. 6(e). A solid line in FIG. 6(e) represents the waveform in the case of $\alpha = 1.0$.

As will be seen in FIG. 6, with regard to the luminance signal, a picture signal is displaced downwardly by one scanning line width with respect to the true pattern, which is similar to the case shown in FIG. 5. As shown by the dash line in FIG. 6(e), it is obvious that if the coefficient $\alpha$ is selected at a value larger than 1, then an effect can be obtained for emphasizing a contour in the vertical direction, called "preshoot". More particularly, according to the present invention, the high frequency component of the luminance signal is synthesized by subtracting the narrow-band signal from the wide-band siganl. As a matter of course, contour emphasis in the horizontal direction is applied to the luminance signal in the form of a second order differential equation. Moreover, a great advantage is obtained because the resolution in the vertical direction can be enhanced up to a value close to the number of scanning lines despite of the fact that vertical correlation is involved. At the same time, contour correction in the vertical direction can be also achieved.

In other words, the present invention can provide an epoch-making solid-state color imaging apparatus. Despite the fact that only one solid-state area image sensor is used, the upper limit resolution determined by the number of picture elements in the area image sensor can be attained in both the vertical and horizontal directions. Also contour correction can be achieved in both the vertical and horizontal directions, and a picture image having an excellent sharpness can be obtained.

Here, it is to be noted that the red signal and the blue signal are always deviated from each other by one horizontal scanning period. With regard to the red signal and the blue signal, in every horizontal scanning period, one signal is produced from the output signal of the area image sensor 11 without passing through the 1H delay line 12 (FIG. 3a), the other signal is produced from the output signal of the area image sesnor 11 after passing through the 1H delay line 12.

Consequently, a somewhat color aberration occurs in the vertical direction. Such a color aberration is not so serious, because the human eye's sensitivity for red and blue lights is low. However, at contour portions of a reproduced image, the above-mentioned color aberration is a problem.

FIG. 7 shows a color encoder 27 and its peripheral circuits which are modified with respect to those shown in FIG. 3 to eliminate the above-mentioned color deviation.

Into FIG. 7, the output signal $G_H$ of the subtractor 16 is applied to a low-pass filter 61 as well as to the process amplifier 17. The low-pass filter 61 removes a high frequency component from the high frequency green signal $G_H$. The resulting output includes only a contour signal $G_{HL}$ in the vertical direction. Then the contour signal $G_{HL}$ is applied to an absolute value converter circuit 62, which folds back the negative side signal portion of the contour signal $G_{HL}$ to the positive side. The absolute value converter circuit 62 is, for example, similar to a full-wave rectifier circuit. The output signal $G_{HL}$ of this absolute value converter circuit 62 is transformed into a control signal in an amplifier or waveform shaper circuit 63, and then it is fed to the modified color encoder 27'.

Within the color encoder 27; this transformed control signal reduces the amplitude of the chrominance signal or cuts off the chrominance signal. The modified color encoder 27' (FIG. 7) includes an added circuit 64 for controlling the chrominance signal to the color encoder 27 in FIG. 3. Referring now to FIG. 7, the internal construction of the color encoder 27' will be explained in greater detail. A narrow-band luminance signal $Y_N$ is synthesized by a matrix circuit 51 from the narrow-band green signal $G_N$, red signal R and blue signal B which are fed from process amplifiers 19, 25 and 26, respectively. In a (R-Y) modulator 52, a sub-carrier signal fed through a terminal 53 is modulated with a color difference signal $(R-Y_N)$ synthesized from the luminance signal $Y_N$ and the red signal R. Likewise, a (B-Y) modulator 54 modulates a sub-carrier signal fed through a terminal 55 with another color difference signal (B-Y$_N$) synthesized from the luminance signal Y$_N$ and the blue signal B. The output signals of these two modulators 52 and 54 are mixed in a mixer 56 to synthesize a chrominance signal. On the other hand, the low frequency luminance signal Y$_N$ at the output of the matrix circuit 51 and the high frequency component of the green signal fed from the process amplifier 17 are mixed in a mixer 57 to synthesize a wide-band luminance signal Y.

The chrominance signal derived at the output of the mixer 56 is processed to reduce or cut off the corresponding chrominance signal at the contours, in the vertical direction, by an amplitude limiter circuit 64 under a control of the signal fed from the amplifier or waveform shaper circuit 63. Then, the chrominance signal is fed to a mixer 58 to form a composite color television signal, together with the luminance signal Y.

FIG. 8 illustrates another modification of the color encoder and its peripheral circuit for eliminating the color aberration in the vertical direction. FIG. 8 includes a difference from the modification shown in FIG. 7 in the process for detecting the contour signal in the vertical direction, from among the high frequency component G$_H$ of the green signal. In more detail, the wide-band green signal G$_{WL}$ derived at the output of the green signal detector circuit 13 is passed through a low-pass filter 65 having the same characteristics as the low-pass filter 19, and then the green signal is fed to a delay line 66. At the two inputs of a subtractor 67, the output of this delay line 66 brings the signal in-phase with the narrow-band green signal G$_N$ which is fed from the low-pass filter 18. The output signal of the subtractor 67 is a contour signal in the vertical direction. It does not include any contour signal in the horizontal direction. Similarly to the circuit shown in FIG. 7, this contour signal is sent to an amplitude control circuit 64 within a color encoder 27' via an absolute value converter circuit 62 and an amplifier or waveform shaper circuit 64, 63. The amplitude control circuit 64 reduces or cuts off after 64 the amplitude of the chrominance signal at the contours in the vertical direction.

As described above, when the color encoder and its peripheral circuits, according to the modifications shown in FIGS. 7 or 8 are employed, a color aberration would not appear on the reproduced picture image, because the chrominance signal is reduced in amplitude at the contours in the vertical direction of the image. Therefore, the contours becomes more clear.

Now a description will be made of a second embodiment of the present invention with reference to FIG. 9. Basically, in a manner similar to the first embodiment of the invention, an output signal of an area image sensor 11 is divided into a signal passing through a 1H delay line 12 and another signal not passing through the same delay circuit. They are converted into a consecutive green signal in a first green signal detector circuit 13. Then this signal is transformed into a wide-band green signal G$_W$ while in a low-pass filter 14 and an appropriate delay circuit 15. A circuit for producing a red signal R and a blue signal B from the output signal of the area image sensor 11 is also similar to that used in the first embodiment (FIG. 3). It comprises a red/blue detector circuit 20, a blue/red detector circuit 21, switches 22a and 22b, low-pass filters 23 and 24, and process amplifiers 25 and 26.

In a second green signal detector circuit 29, a green signal component is detected from the output signal of the area image sensor 11. Then, the green signal is passed through a low-pass filter 18 to form a narrow-band green signal G$_N$. Thereafter the narrow-band green signal is mixed in a mixer 33 with a signal obtained by passing the output signal of the low-pass filter 14 through a low-pass filter 32 having the same characteristics as the low-pass filter 23. Further, the mixed signal is subjected to waveform processing in a process amplifier 19 to obtain a green signal G$_N$ to be applied to a color encoder 27.

A difference between the output signal of the delay circuit 15 and the output signal of the low-pass filter 18 is produced in the subtractor 16. The difference signal is amplified by an amplifier 17 to obtain a high frequency green signal. The respective output signals of the amplifier 17 and the process amplifiers 19, 25 and 26 are processed in a color encoder 27, as illustrated in detail in FIG. 3(b), to obtain a composite color television signal at an output terminal 28.

If the color imaging system of FIG. 9 uses an area image sensor 11 associated with a color filter as illustrated in FIG. 1, then although modulation characteristics in the vertical direction are somewhat degraded compared to the first embodiment (FIG. 3), another shortcoming can be improved as described below. That is, in the first embodiment of the present invention shown in FIG. 3 (a), the low frequency component of the green signal is obtained by directly sampling the output of the area image sensor 11 in the second green signal detector circuit 29. There are then the following shortcomings. For instance, when the prior art imaging system shown in FIG. 2 is employed, for an imaged body, whose black-and-white pattern has a space frequency (Nyquist frequency) in the horizontal direction corresponding in a one-to-one relation to the space frequency of the picture element array, the output signal has a uniform value equal to the intermediate level between the white level and the black level. When the color imaging system according to the first embodiment of the present invention as shown in FIG. 3 is employed, white and black pattern elements alternately correspond to the successive picture elements in every horizontal row. Since the green picture elements are arrayed in a checkerboard pattern on the area image sensor 11, only white signal elements and only black signal elements appear alternately on the successive scanning lines.

There is a phenomenon where the true subject body has a longitudinally striped black-and-white pattern, the imaged picture is transformed into a laterally striped black-and-white pattern. Therefore, an imaging apparatus designed to mitigate this undesirable phenomenon is the imaging apparatus constructed according to the second embodiment of the present invention shown in FIG. 9. More particularly, according to the second embodiment, the degree of transformation from a longitudinally striped pattern to a laterally striped pattern is mitigated by mixing in the mixer 33 a low frequency component produced by correlating the signals for two adjacent scanning lines (the output signal of the low-pass filter 32 having the same characteristics as the low-pass filter 23) and a low frequency component obtained by directly sampling the output of the area image sensor 11 (the output signal of the low-pass filter 18). There is an appropriate mixing ratio so that the sum signal may always have a predetermined level, and thereby producing the low frequency component of the green signal.

In this second embodiment (FIG. 9), it is also possible to employ the modification illustrated in FIGS. 7 or 8 for the purpose of obtaining a clear contour in a reproduced image.

In the above-described first and second embodiments, the contour signal in the vertical direction was of a preshoot type. Now a description will be made on the case where a contour signal of an overshoot type is synthesized.

A third embodiment of the present invention (FIG. 10) is an imaging system using a synthesized overshoot. Although the FIG. 10 circuit is basically similar to that shown in FIG. 3, it is different in that the narrow-band green signal $G'_N$, which is to be used upon synthesizing the high frequency component $G_H$ of the luminance signal is not the signal, $G_N$ obtained by directly sampling the output signal of the area image sensor 11 in the green signal detector circuit 29. The narrow-band green signal $G'_N$, is obtained by detecting a signal corresponding to the picture elements sensitive to the green light from the output signal of the area image sensor 11 passed through the 1H delay line 12. This signal $G'_N$ is detected in a third green signal detector circuit 34 and passed through a low-pass filter 35 having the same characteristics as the low-pass filter 18 (FIG. 2).

With respect to the other points, the imaging system illustrated in FIG. 10 is exactly the same as the first embodiment of the system shown in FIGS. 3(a) and 3(b). In other words, the third embodiment is different from the first embodiment only in that the third green signal detector circuit 34 and the low-pass filter 35 are newly added to the first embodiment.

FIGS. 11 and 12 are waveform diagrams showing various signal waveforms appearing in the third embodiment (FIG. 10). These waveform diagrams correspond to the waveform diagrams shown in FIGS. 5 and 6 and relating to the first embodiment (FIG. 3), respectively. In FIGS. 11 and 12, waveforms shown at (a), (b) and (c) are similar to those shown at (a), (b) and (c), respectively, in FIGS. 5 and 6, and so there is no need to explain them at this point. The waveforms shown at (d) in FIGS. 11 and 12 represent the narrow-band green signal $G_N'$ obtained from the output signal of the 1H delay line 12 (FIG. 10). Therefore, they are displaced downwardly by one scanning line width with respect to the waveforms shown at (c) in FIGS. 11 and 12. Then, the high frequency component $G_H$ of the luminance signal, that is, $G_W$-$G_N'$ takes the waveforms shown at (e) in FIGS. 11 and 12.

Considering now the luminance signal with respect to only the green signal. The luminance signal is represented by $0.6G_N + \alpha G_H$. That is, the luminance signal has the waveform shown at (f) in FIGS. 11 and 12. In this formula, the parameter $\alpha$ is a coefficient for aperture correction, and it is generally larger than 1. FIGS. 11 and 12 show the waveforms in the case of $\alpha=1$. As will be seen from FIGS. 11 and 12, in the case of the third embodiment shown in FIG. 10, the picture image of the luminance signal is reproduced at the same spatial position as the subject body being imaged. It is not displaced downwardly by one scanning line width as is the case with the first embodiment shown in FIG. 3. In addition, it will be understood that the effect of contour emphasis is of an overshoot type in the case of the third embodiment shown in FIG. 10.

In the case of the third embodiment shown in FIG. 10 also, the frequency bands of the respective signal routes in the color imaging system are identical to those shown in FIG. 4.

As described above, in the third embodiment shown in FIG. 10, it is also obvious that despite the fact that only one solid-state area image sensor is used, the resolution can be enhanced up to the upper limit resolution determined by the number of picture elements, both in the vertical direction and in the horizontal direction. Also a picture image can be obtained with contour correction in the horizontal direction as well as in the vertical direction.

Here it is to be noted that even in this third embodiment there is little color aberration in the vertical direction. Two alternative modifications of the color endoder and its peripheral circuit, for improving the above-mentioned color aberration at the contour portion of the reproduced image, are illustrated in FIGS. 13 and 14, respectively.

FIG. 13 shows a modification which may be applied to the third embodiment shown in FIG. 10. Basically this modification is the same as that applied to the first embodiment (FIG. 3) and further illustrated in FIG. 7. Therefore, component parts which are equivalent to those shown in FIGS. 7 and 10 are given like reference numerals and will not be explained further.

More particularly, the output signal $G_H$ of the subtractor 16 is passed through a low-pass filter 61 to pick up the high frequency component and thereby obtain, at the output of the low-pass filter 61, only a contour signal $G_{HL}$ in the vertical direction. This contour signal $G_{HL}$ is converted into an absolute value signal by an absolute value converter circuit 62. The converter folds back the portion of the signal on the negative side with respect to a reference level to the positive side. Thereafter the converted signal is passed through an amplifier or waveform shaper circuit 63 to obtain a control signal for controlling an amplitude of a chrominance signal.

Within a color encoder 27', the output signals of the process amplifiers 19, 25 and 26 are applied to a matrix circuit 51 to obtain a narrow-band luminance signal $Y_N$. This luminance signal $Y_N$ and the output signal of the process amplifier 25 are applied to an (R-Y) modulator 52 where a sub-carrier signal applied through a terminal 53 is modulated with a color difference signal (R-$Y_N$) to obtain an (R-Y) signal. On the other hand the luminance signal $Y_N$ and the output signal of the process amplifier 26 are applied to a (B-Y) modulator 54 where a sub-carrier applied through a terminal 55 is modulated with a color difference signal (B-$Y_N$) to obtain a (B-Y) signal. The (R-Y) signal and the (B-Y) signal are mixed in a mixer 56 to obtain a chrominance signal. The amplitude of this chrominance signal produced by mixer 56 is controlled to an amplitude control circuit 64 by the above-described control signal produced in the amplifier or waveform shaper circuit 63. The narrow band luminance signal $Y_N$ and a high frequency green signal $G_H$ derived at the output of the amplifier 17 are mixed in a mixer 57 to obtain a luminance signal Y. This luminance signal Y and the chrominance signal output from the amplitude control circuit 64 are mixed in a mixer 58 to derive a composite color television signal at an output terminal 28.

FIG. 14 also illustrates another modification of the color encoder and its peripheral circuit for improving the above-described color aberration in the vertical direction. The modification is equivalent to the modification applied to the first embodiment and illustrated in FIG. 8. The color encoder 27', the absolute value converter circuit 62 and the amplifier or waveform shaper circuit 63 are identical to those shown in FIG. 13. Also, the circuit section for synthesizing the respective green, red and blue signals which includes the first green signal detector circuit 13, the low-pass filter 14, the delay circuit 15, the subtractor 16, the amplifier 17, the low-pass filter 35 and the process amplifiers 19, 25 and 26, is identical to that included in the third embodiment shown in FIG. 10.

However, in this modification (FIG. 14), the wide-band green signal $G_{WL}$ is derived at the output of the first green signal detector circuit 13 and is passed through a low-pass filter 65 having the same characteristics as the low-pass filter 35, and then fed to a delay circuit 66. This delay circuit 66 brings the output signal of the delay circuit 66 into phase with the narrow-band green signal $G'_N$, which is fed from the low-pass filter 35. Thus, the two signals appearing at the input end of a substractor 67 are in phase. In the subtractor 67, the output signal of the delay circuit 66 is subtracted from the narrow-band green signal $G_N'$. The resulting output signal $G_{HL}$ of the subtractor 67 is the contour signal itself in the vertical direction. The contour signal is not contained in the horizontal direction. This contour signal is passed, similarly to the modification shown in FIG. 13, through an absolute value converter circuit 62 and an amplifier or waveform. Then it is shaper circuit 63 fed to an amplitude control circuit 64 of the color encoder 27'. In this amplitude control circuit 64, the amplitude of the chrominance signal, at the contours in the vertical direction, is reduced or cut off by the output of the amplifier or waveform shaper circuit 63.

Owing to the above-mentioned circuit construction, the amplitude of the chrominance signal is limited at the contours in the vertical direction. The color aberration in the vertical direction does not occur in the reproduced picture image. Since the serious color aberration occurs at the contours, the color aberration can be eliminated or reduced to a negligible value.

While the description has been made above in connection with some preferred embodiments of the present invention, the invention should not be limited to the above-described embodiments. The locations where the high frequency component $G_H$ of the green signal is to be mixed with the other color signals as a high frequency component of a luminance signal, may be at the input side of the process amplifiers 19, 25 and 26 for the red signal, green signal and blue signal, respectively, instead of in the interior of the color encoder 27, this modification is shown by dash lines in FIG. 3 (a). In this case, if the high frequency component $G_H$ is mixed after its amplitude is made equal to that of the other three signals, a similar effect and advantage can be obtained. In order to obtain a reproduced picture image which can afford natural feedings as a picture image, the modification shown by dash lines in FIG. 3 (a) is somewhat more excellent. With regard to simplicity of the circuit, however, the mixing within the color encoder 27 as shown in FIG. 3 (b) is more excellent.

Any suitable type of area image sensors can be used for practicing the present invention, provided that the respective light sensitive elements are isolated from and independent of each other including the difference in fields. It is obvious that area image sensors of, for instance, MOS transistor type, CID type, interline transfer CCD type, etc. can be employed. Further, with respect to the filter elements covering the solid-state light sensitive elements, white light permeable filter, yellow light permeable filter and cyan color light permeable filter may be employed instead of the green light permeable filter, the red permeable filter and the blue light permeable filter.

What is claimed is:

1. A solid-state color imaging apparatus comprising a solid-state area image sensor means having picture elements in rows and columns, said sensor means including a first group of picture elements having a first spectral sensitivity characteristic which requires a visually high resolution at the time when an image is reproduced responsive to signals picked up by said sensor means, second and third groups of picture elements having a second and third spectral sensitivity characteristics, respectively, said first group of picture elements being arrayed at alternate picture element positions in every row and at alternate scanning line positions in every column, and said second and third group of picture elements, respectively, being arrayed in alternative rows; delaying means for delaying the output signal of said solid-state area image sensor means by a period corresponding to the scanning of one scanning line, first detector circuit means for picking up output signals of said first group of picture elements from among the output signal of said solid-state area image sensor means, second detector circuit means for picking up alternately output signals of said second group of picture elements and output signals of said third group of picture elements from the output signal of said solid-state area image sensor means, third detector circuit means for picking up alternatively output signals of said second group of picture elements and output signals of said third group of picture elements, from the output signal of said delaying means, the pick-up signals from said second and third detector circuit means being different from each other, fourth detector circuit means for picking up output signals of said first group of picture elements alternately from the output signal of said solid-state area image sensor means and from the output signal of said delaying means for the successive picture element positions, first signal synthesizer means for synthesizing low frequency component of a luminance signal and two kinds of color difference signals from the output signals of said first, second and third detector circuit means, second signal synthesizer means for synthesizing a high frequency component of the luminance signal by subtracting the output signal of said first detector circuit means from the output signal of said fourth detector circuit means, and third signal synthesizer means for synthesizing a composite color television signal from said low and said high frequency components of said luminance signal and said two kinds of color difference signals.

2. The solid-state color imaging apparatus as claimed in claim 1, in which the output signal of said first detector circuit means is mixed with the output signal of said fourth detector circuit means and then fed to said first signal synthesizer means together with the output signals of said second and third detector circuit means.

3. The solid-state color imaging apparatus as claimed in claim 1, in which said high frequency component of the luminance signal has a somewhat larger amplitude than said low frequency component of the luminance signal.

4. The solid-state color imaging apparatus as claimed in claim 1, further comprising a fifth detector circuit means for picking up output signals of said first group of picture elements from the output signal of said delaying means, said high frequency component of the luminance signal being obtained by subtracting the output signal of said fifth detector circuit means from the output of said fourth detector circuit means, and said low frequency component of the luminance signal and said two kinds of color difference signals being synthesized from the output signals picked up from said first, second and third detector circuit means.

5. The solid-state color imaging apparatus as claimed in any one of claims 1 to 4, 12 or 13 in which said first spectral sensitivity characteristic is a sensitivity characteristic for green light, and said second and third spectral sensitivity characteristics are sensitivity characteristics for red light and blue light, respectively.

6. The solid-state color imaging apparatus as claimed in any one of claims 1 to 4, 12, or 13 in which said first spectral sensitivity characteristic is a sensitivity characteristic for all light, and said second and third spectral sensitivity characteristics are sensitivity characteristics for yellow light and cyan color light, respectively.

7. A solid-state color imaging apparatus comprising a solid-state area image sensor means having picture elements arranged in rows and columns, said sensor means including first picture elements sensitive to green light arrayed at alternate picture element positions in every row and at alternate scanning line positions in every column, the remaining picture elements comprising second picture elements sensitive to red light and third picture elements sensitive to blue light, said second and third picture elements being arrayed in alternate rows, first detector circuit means for detecting a signal corresponding to said first picture elements from the output signal of said solid-state area image sensor means to output a first green signal, second detector circuit means for detecting signals corresponding to said second and third picture elements from the output signal of said solid-state area image sensor means to output a red signal and a blue signal, delay circuit means for delaying the output signal of said solid-state area image sensor means by a period corresponding to the scanning of one scanning line, third detector circuit means for detecting signals corresponding to said second and third picture elements from the output signal of said delay circuit means to output a red signal and a blue signal, the outputs from said second and third detector circuit means being different from each other at the same scanning period, fourth detector circuit means for detecting a signal corresponding to said first picture elements alternately from the output signal of said solid-state area image sensor means and from the output signal of said delay circuit means for the successive picture element positions to output a second green signal, switching circuit means for alternately switching between the output signal of said second detector circuit means and the output signal of said third detector circuit means for the successive scanning line positions to separate said red signal and said blue signal from each other, first synthesizer circuit means for synthesizing a low frequency component of a luminance signal and two kinds of color difference signals responsive to the output signal of said first detector circuit and two output signals of said switching circuit means, second synthesizer circuit means for synthesizing a high frequency component of the luminance signal by subtracting said first green signal from said second green signal, and third synthesizer circuit means for synthesizing a composite color television signal from said low frequency component of said luminance signal, said two kinds of color difference signals and said high frequency component of said luminance signal.

8. The solid-state color imaging apparatus as claimed in claim 7, in which said first detector circuit means includes a sampling circuit means for sampling the output signal derived from said first picture elements among the output signal of said solid-state area image sensor means and a mixer means for mixing the output signal of said sampling circuit means and a part of said second green signal at a certain mixing ratio, the output signal of said mixer means being employed as said first green signal.

9. The solid-state color imaging apparatus as claimed in claim 7 or 8, in which a signal obtained by subtracting said first green signal from said second green signal has an amplitude which is larger than the amplitude of said low frequency component of the luminance signal.

10. A solid-state color imaging apparatus comprising a solid-state area image sensor means having picture elements arranged in rows and columns, said sensor means including first picture elements having a first spectral sensitivity characteristic which is required to have a visually high resolution at the time when an image is reproduced responsive to signals picked up by said sensor means, said first picture elements being arrayed at alternate picture element positions in every row and at alternate scanning line positions in every column, the remaining picture elements comprising second picture elements having a second spectral sensitivity characteristic and third picture elements having a third spectral sensitivity characteristic, said second and third spectral sensitivity characteristics having a visual resolution which may be lower than said high resolution, said second and third picture elements, respectively, being arrayed in alternate rows 1 H delay line means for delaying the output signal of said solid-state area image sensor means by a period corresponding to the scanning of one scanning line, first detector circuit means for detecting a signal corresponding to said first picture elements in at least one of the output signals of said solid-state area image sensor means and the output signal of said 1 H delay line means, second and third detector circuit means for detecting a signal corresponding to said second picture elements and a signal corresponding to said third picture elements, respectively, from the output signal of said solid-state area image sensor means and from the output signal of said 1 H delay line means, fourth detector circuit means for detecting a signal corresponding to said first picture elements alternately from the output signal of said solid-state area image sensor means and from the output signal of said 1 H delay line means for the successive picture element positions, first synthesizer circuit means for synthesizing a low frequency component of a luminance signal and two kinds of color difference signals from the output signals of said first, second and third detector circuit means, second synthesizer circuit means for synthesizing a high frequency component of the luminance signal by subtracting the output signal of said first detector circuit means from the output signal of said fourth detector circuit means, third synthesizer circuit means for synthesizing a chrominance signal from said two kinds of color difference signals, contour signal detector circuit means for detecting only a contour signal in the vertical direction from the output signals of said first and fourth detector circuit means, means for folding back a portion of said contour signal which is on the negative side of a reference level, said fold back being toward the positive side thereof, amplitude control circuit means for controlling the amplitude of said chrominance signal responsive to an output signal of said folding means, and fourth synthesizer circuit means for synthesizing a composite color television signal from said low and said high frequency components of the luminance signal and an output signal of said amplitude control circuit.

11. The solid-state color imaging apparatus as claimed in claim 10, in which said first spectral sensitivity characteristic is a sensitivity characteristic for green light, and said second and third spectral sensitivity characteristics are sensitivity characteristics for red light and blue light.

12. The solid-state color imaging apparatus as claimed in claim 2, in which said high frequency component of the luminance signal has a somewhat larger amplitude than said low freqency component of the luminance signal.

13. The solid-state color imaging apparatus as claimed in claim 3, further comprising a fifth detector circuit means for picking up output signals of said first group of picture elements from the output signal of said delaying means, said high frequency component of the luminance signal being obtained by subtracting the output signal of said fifth detector circuit means from the output of said fourth detector circuit means, and said low frequency component of the luminance signal and said two kinds of color difference signals being synthesized from the output signals picked up from said first, second and third detector circuit means.

14. A solid-state color imaging apparatus comprising a mosaic of elementary light sensitive areas, at least some of said areas being individually associated with specific colors, means for sensitizing said areas to respond to said individually associated colors, at least one of said colors requiring a greater resolution than another of said colors at the time when an image is reproduced responsive to images picked up by said light sensitive areas, the areas for sensing said one color which require greater resolution being arranged in a checkerboard pattern on said mosaic, means responsive to light falling on any of said areas for generating a narrow band signal representing the color to which that area which is generating the signal is sensitive, means responsive to said one color of light requiring greater resolution for generating a wide band signal which is delayed relative to the narrow band signal of said one color, means responsive to all of said narrow band signals for synthesizing a narrow band luminance signal, means for mixing said synthesized narrow band luminance signal and said wide band signal to generate a wide band luminance signal, and means for mixing said narrow band signals to generate a chrominance signal which may be combined with said wide band luminance signal to produce a video signal.

15. The apparatus of claim 14 and means for setting the level of said wide band signal of one color at a level which is higher than the level of said narrow band signals.

16. The apparatus of claim 14 and means responsive to said delayed signal for effectively filling in the signals produced in said checkerboard pattern, whereby the effective output of said mosaic is as if there were an area sensitized to said one color in each area of said checkerboard, thereby increasing the resolution of said one color areas.

17. The apparatus of any one of the claims 14–16 and means for subtracting one color narrow band signal from the delayed wide band signal synthesizing a high frequency signal of said one color to produce said luminance signal at a level in the range of $0.6G_N + \alpha G_H$, where: $G_N$ is the narrow band signal of said one color, $G_H$ is the high frequency signal of said one color, and $\alpha$ is a co-efficient of aperture correction.

18. The apparatus of claim 17 where $\alpha$ is greater than 1.

19. The apparatus of claim 17 where $\alpha$ is in the range of approximately 1.4 to 1.6.

20. The apparatus of claim 17 where $\alpha$ is equal to 1.

21. The apparatus of claim 17 where $\alpha$ is set to emphasize an image contour in the vertical direction.

22. The apparatus of claim 17 where $\alpha$ is set to enhance image resolution to a value approximately equal to the number of scanning lines in a video picture.

* * * * *

UNITED STATES PATENT AND TRADEMARK OFFICE
CERTIFICATE OF CORRECTION

PATENT NO. : 4,339,771

DATED : July 13, 1982

INVENTOR(S) : MASANOBU MORISHITA & TAKANORI TANAKA

It is certified that error appears in the above—identified patent and that said Letters Patent is hereby corrected as shown below:

Col. 2, Line 60, begin a new paragraph at --In--.

Col. 3, Line 29, insert --a-- after "to";

Col. 3, Line 36, delete "by making";

Col. 3, Line 54, insert a comma --,-- after "Moreover";

Col. 3, Line 54, change "leve" to --level--.

Col. 9, Line 17, insert --signal-- after "picture";

Col. 9, Line 47, insert --Fig. 6(d) shows-- after "case,";

Col. 9, Line 48, insert --(Fig. 3(a)-- after "16".

UNITED STATES PATENT AND TRADEMARK OFFICE
CERTIFICATE OF CORRECTION

PATENT NO. : 4,339,771

DATED : July 13, 1982

INVENTOR(S) : MASANOBU MORISHITA & TAKANORI TANAKA

It is certified that error appears in the above—identified patent and that said Letters Patent is hereby corrected as shown below:

Col. 10, Line 1, "siganl" should be --signal--;

Col. 10, Line 38, change "Into" to --In--;

Col. 10, Line 53, change "27;" to --27',--.

Col. 15, Line 19, begin a new paragraph at --In--;

Col. 15, Line 27, insert --shaper circuit 63-- after "waveform".

Signed and Sealed this

Second Day of November 1982

[SEAL]

Attest:

Attesting Officer

GERALD J. MOSSINGHOFF

Commissioner of Patents and Trademarks